United States Patent
Souza

(10) Patent No.: US 6,386,559 B1
(45) Date of Patent: May 14, 2002

(54) APPARATUS FOR SECURING AND TRANSPORTING A TANK

(76) Inventor: Peter R. Souza, 35 Pico Ave., Winthrop, MA (US) 02152

( * ) Notice: Subject to any disclaimer, the term of this patent is extended or adjusted under 35 U.S.C. 154(b) by 0 days.

(21) Appl. No.: 09/595,469

(22) Filed: Jun. 16, 2000

(51) Int. Cl.[7] ............................................. B62B 3/04
(52) U.S. Cl. ............................ 280/47.26; 280/79.5
(58) Field of Search ................. 280/30, 79.5, 47.18, 280/47.26, 47.24, 652, 654; 297/487

(56) References Cited

U.S. PATENT DOCUMENTS

| | | | | |
|---|---|---|---|---|
| 1,873,690 A | * | 8/1932 | Ward | 280/79.5 |
| 2,901,261 A | | 8/1959 | Olvey | |
| 3,456,960 A | | 7/1969 | Rector | |
| 3,565,384 A | * | 2/1971 | Lockwood | 280/79.5 |
| 4,205,937 A | | 6/1980 | Fawley | |
| 4,289,326 A | | 9/1981 | Hawkes | |
| 4,424,999 A | * | 1/1984 | Commins | 280/79.5 |
| 4,448,440 A | * | 5/1984 | Gier | 280/79.5 |
| 4,544,173 A | | 10/1985 | Kellermyer | |
| 4,865,346 A | | 9/1989 | Carlile | |
| 4,874,203 A | * | 10/1989 | Henley | 280/79.5 |
| 4,889,267 A | | 12/1989 | Bolton | |
| 4,905,855 A | * | 3/1990 | Troiano et al. | 280/79.5 |
| 4,940,003 A | | 7/1990 | Mayhew et al. | |
| 4,949,890 A | | 8/1990 | Schultz | |
| 5,201,638 A | | 4/1993 | Bieri | |
| 5,393,080 A | * | 2/1995 | Ross | 280/79.5 |
| 5,395,154 A | * | 3/1995 | Wang | 297/130 |
| 5,431,422 A | | 7/1995 | Gamache | |
| 5,454,576 A | | 10/1995 | Pitkanen | |
| 5,460,307 A | * | 10/1995 | Stevenson | 224/153 |
| 5,489,183 A | * | 2/1996 | Malden et al. | 280/47.28 |
| 5,707,106 A | * | 1/1998 | Clark | 280/30 |
| 5,752,634 A | | 5/1998 | Kortman | |
| 5,806,867 A | * | 9/1998 | Hampton | 280/79.5 |
| 6,042,130 A | * | 3/2000 | Souza | 280/79.5 |
| 6,131,925 A | * | 10/2000 | Weldon | 280/30 |
| 6,174,032 B1 | * | 1/2001 | Conaway | 280/487 |

FOREIGN PATENT DOCUMENTS

RU 225710 12/1968

* cited by examiner

*Primary Examiner*—Lanna Mai
*Assistant Examiner*—Jeffrey J. Restifo

(57) ABSTRACT

An apparatus for securing and transporting a tank is disclosed, which includes a carrier for supporting the tank. The carrier includes a base member for resting the tank thereon, and the base member has a forward portion and a rearward portion. The carrier further includes a back member mounted on the base member. The back member has a mounting end mounted to the base member and a handle end opposite the mounting end. The back member is pivotally coupled to the base member such that the base member is pivotable between a stored position with the base member located adjacent to the back member and a deployed position with the base member located substantially perpendicular to the back member. A securing band is provided for securing the tank to the carrier, and the securing band extends between the base member and the back member. A saddle member is provided for saddling the tank when the tank rests on the base member. The securing band is adapted to hold the saddle member against a tank resting on the base member.

17 Claims, 3 Drawing Sheets

APPARATUS FOR SECURING AND TRANSPORTING A TANK

BACKGROUND OF THE INVENTION

1. Field of the Invention

The present invention relates to carrier devices for gas tanks, such as propane gas tanks and more particularly pertains to a new apparatus for securing and transporting a container, such as a propane gas tank.

2. Description of the Prior Art

The use of carrier devices for gas tanks, such as propane gas tanks, is known in the art. The popularity of devices fueled by propane, such as portable outdoor food cooking grills, has increased the need to more frequently transport the tanks for filling with a new supply of propane. These tanks are constructed of heavy metal to withstand the high internal pressure produced by the compressed gas therein, and makes the tanks heavy and cumbersome and, as a result, difficult to carry. The heavy weight also presents a danger to occupants of a passenger vehicle when the tank is loaded on the vehicle for transport. An unsecured tank may move about the passenger compartment of the vehicle during periods of quick deceleration and acceleration, and movement of the tank may injure the occupants. Placement of the tank in the trunk of the vehicle (if the vehicle even has a trunk) does not completely eliminate the danger to occupants, even if the tank can be secured in the trunk.

While the known devices fulfill their respective, particular objectives and requirements, the known art does not disclose an apparatus for securing and transporting a tank, especially in a passenger vehicle.

SUMMARY OF THE INVENTION

The general purpose of the present invention, which will be described subsequently in greater detail, is to provide a new apparatus for securing and transporting a tank apparatus and method which has many of the advantages of the carrier devices for gas tanks mentioned heretofore and many novel features that result in a new apparatus for securing and transporting a tank which is not anticipated, rendered obvious, suggested, or even implied by any of the prior art carrier devices for gas tanks, such as propane gas tanks, either alone or in any combination thereof.

To attain this, the present invention generally comprises an apparatus for securing and transporting a tank, and comprises a carrier for supporting the tank. The carrier includes a base member for resting the tank thereon, and the base member has a forward portion and a rearward portion. The carrier further includes a back member mounted on the base member. The back member has a mounting end mounted to the base member and a handle end opposite the mounting end. The back member is pivotally coupled to the base member such that the base member is pivotable between a stored position with the base member located adjacent to the back member and a deployed position with the base member located substantially perpendicular to the back member. A securing band is provided for securing the tank to the carrier, and the securing band extends between the base member and the back member. A saddle member is provided for saddling the tank when the tank rests on the base member. The securing band is adapted to hold the saddle member against a tank resting on the base member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new apparatus for securing and transporting a tank apparatus and method which has many of the advantages of the carrier devices for gas tanks, such as propane gas tanks mentioned heretofore and many novel features that result in a new apparatus for securing and transporting a tank which is not anticipated, rendered obvious, suggested, or even implied by any of the prior art carrier devices for gas tanks, such as propane gas tanks, either alone or in any combination thereof.

It is another object of the present invention to provide a new apparatus for securing and transporting a tank which may be easily and efficiently manufactured and marketed.

It is a further object of the present invention to provide a new apparatus for securing and transporting a tank which is of a durable and reliable construction.

An even further object of the present invention is to provide a new apparatus for securing and transporting a tank which is susceptible of a low cost of manufacture with regard to both materials and labor, and which accordingly is then susceptible of low prices of sale to the consuming public, thereby making such apparatus for securing and transporting a tank economically available to the buying public.

Still yet another object of the present invention is to provide a new apparatus for securing and transporting a tank which provides in the apparatuses and methods of the prior art some of the advantages thereof, while simultaneously overcoming some of the disadvantages normally associated therewith.

Still another object of the present invention is to provide a new apparatus for securing and transporting a tank for holding a container, such as a propane gas tank.

Yet another object of the present invention is to provide a new apparatus for securing and transporting a tank which includes an apparatus for securing and transporting a tank, and comprises a carrier for supporting the tank. The carrier includes a base member for resting the tank thereon, and the base member has a forward portion and a rearward portion. The carrier further includes a back member mounted on the base member. The back member has a mounting end mounted to the base member and a handle end opposite the mounting end. The back member is pivotally coupled to the base member such that the base member is pivotable between a stored position with the base member located adjacent to the back member and a deployed position with the base member located substantially perpendicular to the back member. A securing band is provided for securing the tank to the carrier, and the securing band extends between the base member and the back member. A saddle member is provided for saddling the tank when the tank rests on the base member. The securing band is adapted to hold the saddle member against a tank resting on the base member.

Still yet another object of the present invention is to provide a new apparatus for securing and transporting a tank that allows safe transport of a propane gas tank on a seat of a vehicle with the tank secured by a seatbelt.

Even still another object of the present invention is to provide a new apparatus for securing and transporting a tank that helps prevent unwanted rolling around of a gas tank when transporting the gas tank thereby reducing the risk of damage to the tank.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
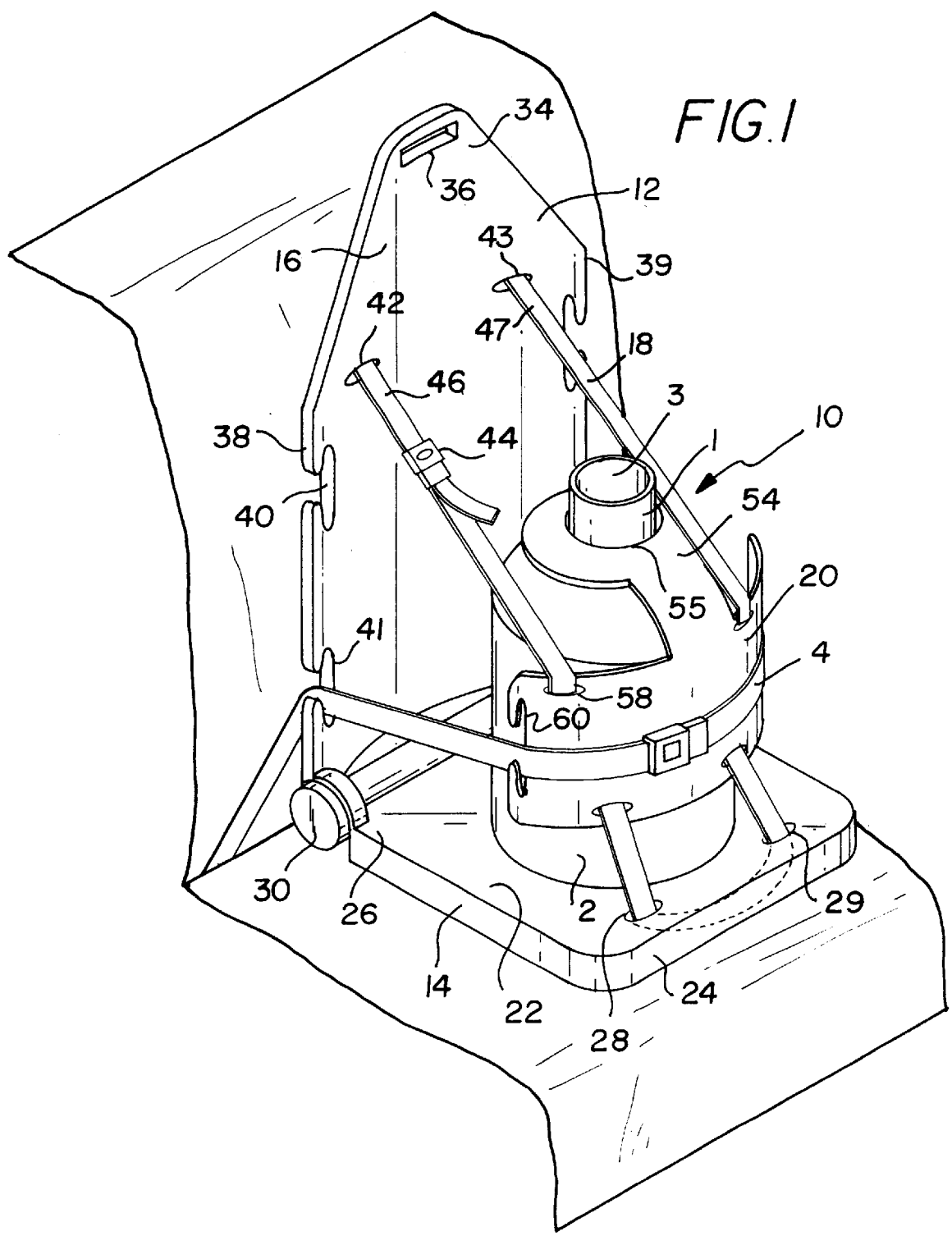
FIG. 1 is a schematic perspective view of a new apparatus for securing and transporting a tank according to the present invention shown in relation to a seat of a vehicle.
Figure 2:
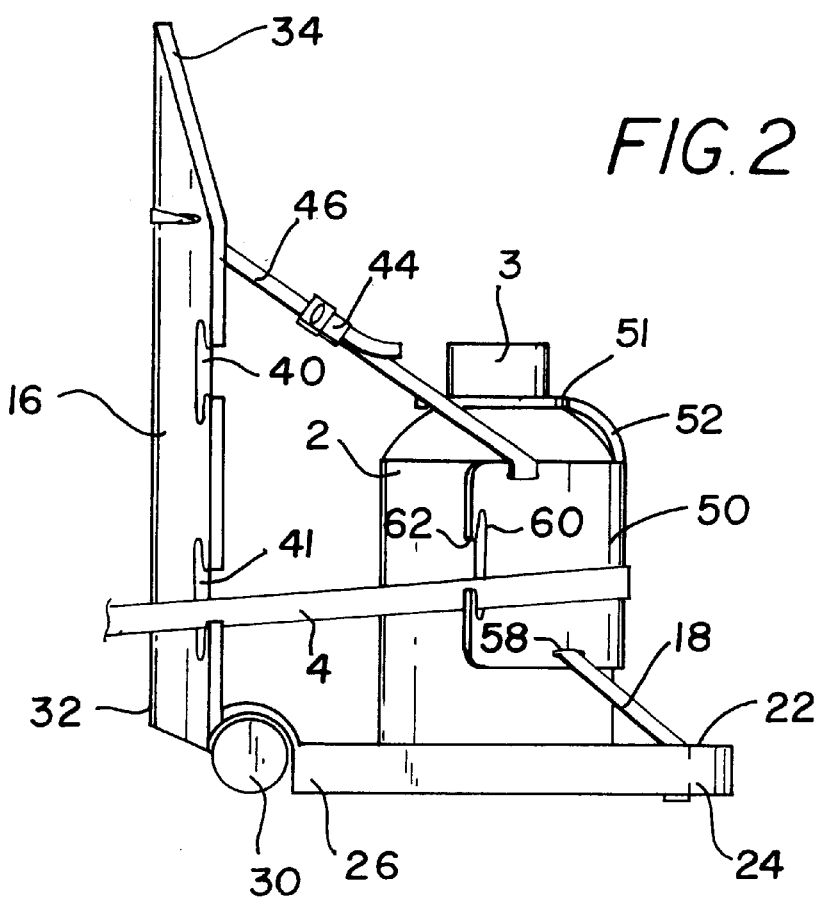
FIG. 2 is a schematic side view of the present invention shown holding a tank.
Figure 3:
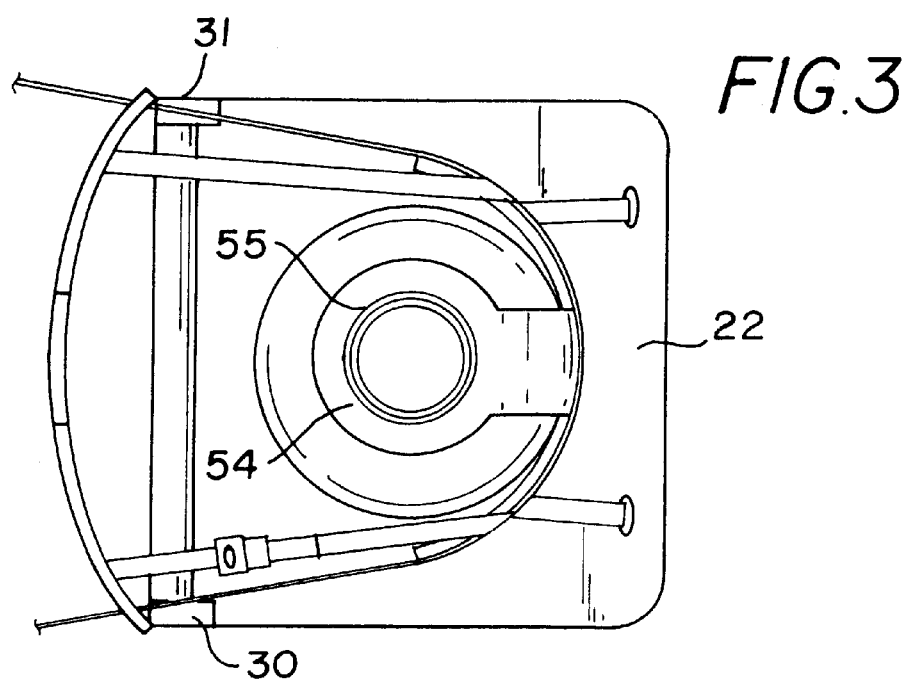
FIG. 3 is a schematic top view of the present invention shown holding a tank.
Figure 4:
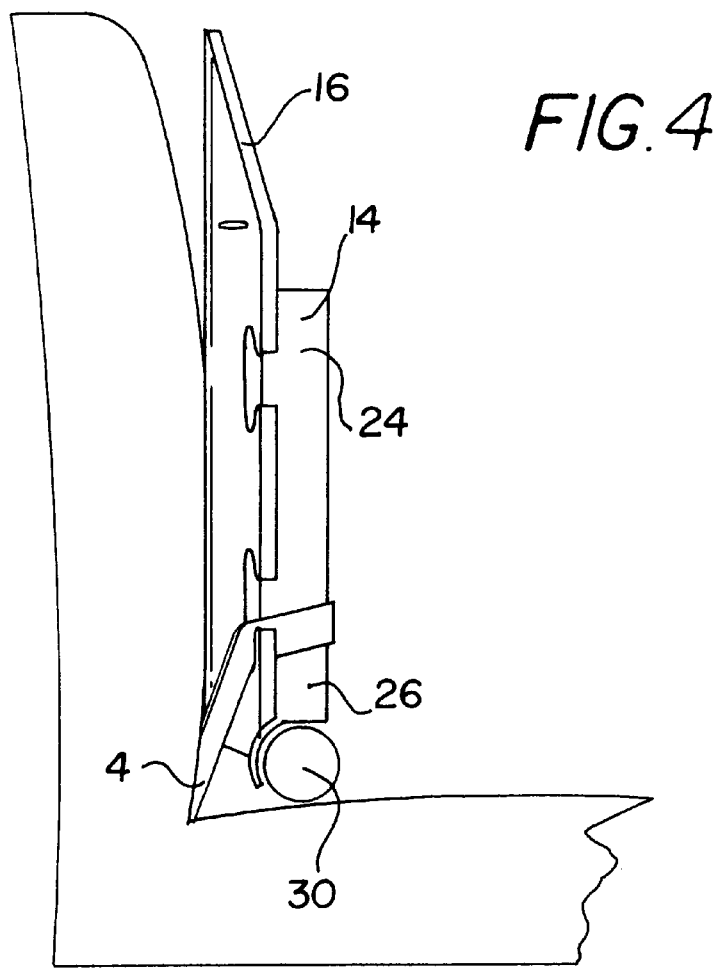
FIG. 4 is a schematic side view of the present invention with the base member pivoted with respect to the back member into the stored position.
Figure 5:
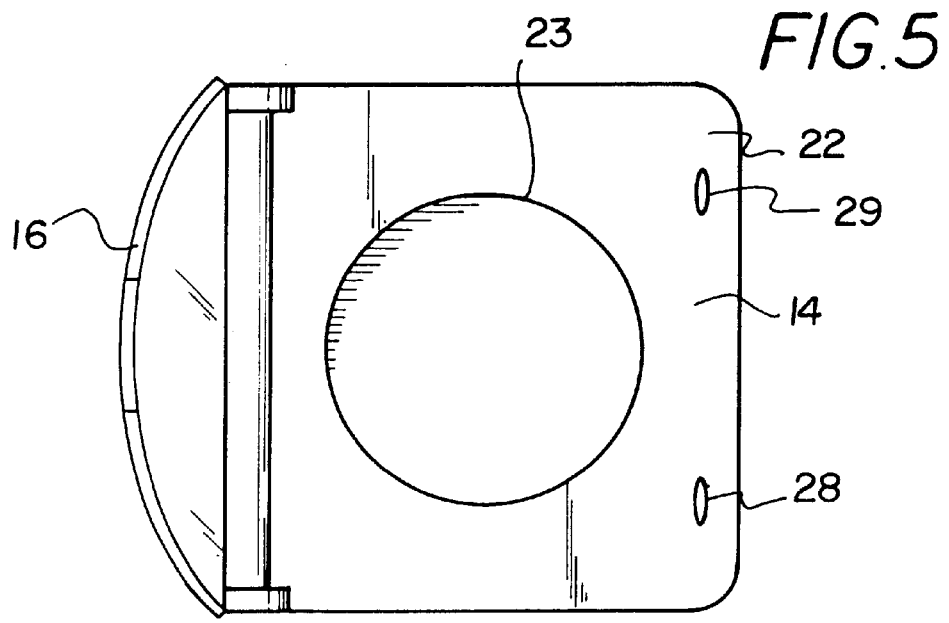
FIG. 5 is a schematic top view of the present invention with the base member shown in the deployed position and particularly illustrating the depression in the base member.

With reference now to the drawings, and in particular to FIGS. 1 through 5 thereof, a new apparatus for securing and transporting a tank embodying the principles and concepts of the present invention and generally designated by the reference numeral 10 will be described.

As best illustrated in FIGS. 1 through 5, the apparatus 10 for securing and transporting a tank 1 generally comprises a carrier 12 for supporting the tank. The carrier 12 comprises a base member 14 and a back member 16 mounted on the base member. A securing band 18 is provided for securing the tank to the carrier, and a saddle member 20 for saddling the tank when the tank is rested on the base member.

A tank 1 suitable for use with the invention generally includes a body portion 2 with a bottom and a top, and a substantially cylindrical valve protective wall 3 secured to the tank adjacent to the top of the tank. The body portion of the tank may have a substantially cylindrical outer surface.

The base member 14 of the carrier is adapted for resting the tank 1 thereon. The base member has an upper surface 22 on which the bottom of the tank may be rested. Thee upper surface of the base member may have a depression 23 formed therein for receiving a portion of the tank adjacent to the bottom of the tank for resisting lateral movement of the tank. The base member has a forward portion 24 and a rearward portion 26. A pair of anchoring apertures 28, 29 may be provided in the base member for receiving a portion of a securing band 18 therethrough. Preferably, the anchoring apertures are located adjacent to the forward portion of the base member. A pair of wheels 30, 31 are preferably mounted on the rearward portion of the base member for permitting the carrier to roll over a ground surface.

The back member 16 of the invention is mounted on the base member. The back member is pivotally coupled to the base member such that the base member is pivotable between a stored position (see FIG. 4) with the base member oriented adjacent (and parallel) to the back member, and a deployed position (see FIG. 5) with the base member oriented substantially perpendicular to the back member. The back member has a mounting end 32 mounted to the base member, and a handle end 34 located opposite of the mounting end. A handle hole 36 is preferably formed in the back member adjacent to the handle end of the back member. The back member has side edges 38, 39 extending between the handle end and the mounting end. Each of the side edges of the back member has a seat belt notch 40 for locating a position of a seat belt 4 passing adjacent to the side edge of the back member. Optionally, upper 40 and lower 41 seat belt notches may be formed in the side edges for permitting the user to select the notch with the position best fitting the vehicle, and may even receive the shoulder belt in conjunction with the lap belt.

A pair of upper apertures 42, 43 formed in the back member are provided for receiving the securing band 18 therethrough. In one embodiment of the invention, the upper apertures are located toward the handle end of the back member. The upper apertures are also preferably laterally spaced from each other.

The securing band 18 is provided for securing the tank 1 to the carrier 12. The securing band has opposite ends that may be selectively linked by a cinching device 44 for adjustably securing a first location of the securing band to a second location of the securing band in a taut condition. The securing band is looped through the upper apertures 42, 43 in the back member and through the anchoring apertures 28, 29 in the base member of the carrier to provide a pair of laterally spaced band portions 46, 47 that extend adjacent to opposite sides of a tank resting on the base member.

One embodiment of the saddle member 20 has a main portion 50 and an engagement portion 51. The saddle member may include a linking portion 52 linking the main portion and the engagement portion of the saddle member. The main portion has opposite side edges and end edges, and may have a substantially rectangular shape. The linking portion may extend from a medial location of the main portion.

The engagement portion preferably forms a band 54 for surrounding the valve protective wall of the tank for securing the engagement portion to the tank. The engagement portion ideally includes a hole 55 for receiving a portion of the valve protective wall 3.

The main portion is preferably adapted for positioning against the body portion 2 of the tank, and most preferably the main portion is adapted for conforming to a portion of the body portion of the tank. Ideally, the saddle member 20 is formed of a thin flexible material for conforming to a contour of an outer surface of the tank. This flexible material may comprise, for example, a plastic material.

Preferably, at least one securing aperture 58 is formed in the saddle member adjacent to each of the side edges of the main portion for receiving a portion of the securing band 18 such that a portion of the securing band passes twice through the saddle member. Two sets of securing apertures may be formed in the saddle member, with each of the sets including the at least one securing aperture positioned adjacent to each of the side edges.

A pair of securing slots 60 may be formed in the saddle member at spaced locations on the main portion of the saddle member for receiving a portion of a seat belt of a vehicle. Each of the securing slots may be located adjacent to one of the end edges of the main portion of the saddle member. Ideally, a channel 62 is formed in the saddle member in communication with each of the securing slots and the adjacent end edge of the main portion of the saddle member. The channels permit a seat belt to be slid into the securing slots without having to thread the ends of the seat belts through the slots.

In use, the tank is rested on the upper surface of the base member, and the engagement band of the saddle member is positioned about the valve protection wall of the tank, and the main portion is positioned against an outer surface of the body portion of the tank. The securing band is looped through the upper apertures of the back member and the anchoring apertures of the base member. The securing band is passed through the securing apertures in the saddle member, and portions of the securing band are connected together using the cinching device. When the carrier is positioned in a vehicle, such as on a seat, a seat belt of the vehicle seat may be looped about the carrier, the tank, and the saddle member. The seat belt is inserted through the seat belt notch in the back member of the carrier, and through the securing slots in the saddle member. The seat belt may be tightened about the assembly, and the seat belt not only holds the assembly against the back of the vehicle seat, but also holds the base member against the lower portion of the vehicle seat.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An apparatus for securing and transporting a tank, the tank being of the type having a body portion with a bottom and a top, and a valve protective wall secured to the tank adjacent to the top of the body portion, the apparatus comprising:

a carrier for supporting the tank, the carrier comprising:

a base member for resting the tank thereon, the base member having an upper surface, the base member having a forward portion and a rearward portion;

a back member mounted on the base member, the back member having a mounting end mounted to the base member and a handle end opposite the mounting end, the back member being pivotally coupled to the base member such that the base member is pivotable between a stored position with the base member located adjacent to the back member and a deployed position with the base member located substantially perpendicular to the back member;

a securing band for securing the tank to the carrier, the securing band extending between the base member and the back member; and a saddle member for saddling the tank when resting on the base member, the securing band being adapted to hold the saddle member against a tank resting on the base member, the saddle member including an engagement portion and a main portion connected together;

wherein the engagement portion of the saddle member forms a band for surrounding the valve protective wall of the tank, the band defining a hole for receiving a portion of the valve of the valve protective wall of the tank for securing the saddle member to the tank, the band defining a continuous loop such that the saddle member must be shifted upwardly on the tank to remove the valve protective wall of the tank from the hole of the loop of the engagement portion; and wherein the main portion of the saddle member has end edges and a pair of securing slots are formed at spaced locations on the main portion of the saddle member in a manner such that insertion of a portion of a seat belt of a vehicle through the securing slots resists upward movement of the saddle member with respect to the tank when the saddle member is held against the tank by the securing band.

2. The apparatus of claim 1 wherein the main portion has opposite side edges and end edges, the saddle member including a linking portion linking the main portion to the engagement portion.

3. The apparatus of claim 2 wherein at least one securing aperture is formed in the saddle member adjacent to each of the side edges of the main portion for receiving a portion of the securing band such that securing band passes twice through the saddle member.

4. The apparatus of claim 3 wherein two sets of securing apertures are formed in the saddle member, each of the sets of securing apertures including the at least one securing aperture adjacent to each of the side edges.

5. The apparatus of claim 2 wherein each of the securing slots is located adjacent to one of the end edges of the main portion of the saddle member.

6. The apparatus of claim 5 additionally comprising a channel in communication with each of the securing slots and an adjacent one of the end edges of the main portion of the saddle member.

7. The apparatus of claim 1 wherein the main portion is conformable to a portion of the body portion of the tank.

8. The apparatus of claim 7 wherein the saddle member is formed of a thin flexible material for conforming to a contour of an outer surface of the tank.

9. The apparatus of claim 1 wherein the upper surface of the base member has a circular depression therein for receiving a circular bottom wall of the tank adjacent to the bottom of the tank.

10. The apparatus of claim 1 wherein the base member has a pair of anchoring apertures for receiving a portion of a securing band therethrough.

11. The apparatus of claim 10 wherein the anchoring apertures are located adjacent to the forward portion of the base member, a pair of wheels being mounted on the rearward portion of the base member.

12. The apparatus of claim 1 additionally comprising a handle hole formed in the back member adjacent to the handle end of the back member.

13. The apparatus of claim 1 wherein the back member has side edges extending between the handle end and the mounting end, each of the side edges of the back member having a seat belt notch for locating therein a portion of a seat belt passing adjacent to the side edge of the back member, each of the seat belt notches forming a gap in the side edge extending into the side edge such that the seat belt is movable through the gap into the notch without disconnecting opposite portions of the seat belt from each other.

14. The apparatus of claim 1 additionally comprising a cinching device for adjustably securing a first location of the securing band to a second location of the securing band.

15. The apparatus of claim 1 additionally comprising a pair of upper apertures in the back member for receiving the securing band therethrough.

16. The apparatus of claim 15 wherein the upper apertures are located toward the handle end of the back member, the upper apertures being laterally spaced from each other.

17. The apparatus of claim 1 wherein the saddle member has a main portion and an engagement portion, the main portion having opposite side edges and end edges, the saddle member including a linking portion linking the main portion and the engagement portion;

wherein the securing band has opposite ends and a cinching device for adjustably securing a first location of the securing band to a second location of the securing band;

wherein the engagement portion of the saddle member forms a band for surrounding the valve protective wall of the tank, the band defining a hole for receiving a portion of the valve of the valve protective wall of the tank for securing the saddle member to the tank, the band defining a continuous loop such that the saddle member must be shifted upwardly on the tank to remove the valve protective wall of the tank from the hole of the loop of the engagement portion;

wherein the main portion of the saddle member has end edges and a pair of securing slots are formed at spaced locations on the main portion of the saddle member in a manner such that insertion of a portion of a seat belt of a vehicle through the securing slots resists upward movement of the saddle member with respect to the tank when the saddle member is held against the tank by the securing band;

wherein the main portion is conformable to a portion of the body portion of the tank;

wherein the saddle member is formed of a thin flexible material for conforming to a contour of an outer surface of the tank;

wherein at least one securing aperture is formed in the saddle member adjacent to each of the side edges of the main portion for receiving a portion of the securing band such that securing band passes twice through the saddle member;

wherein two sets of securing apertures are formed in the saddle member, each of the sets of securing apertures including the at least one securing aperture adjacent to each of the side edges;

wherein a pair of securing slots are formed at spaced locations on the main portion of the saddle member for receiving a portion of a seat belt of a vehicle;

wherein each of the securing slots is located adjacent to one of the end edges of the main portion of the saddle member;

additionally comprising a channel in communication with each of the securing slots and the adjacent end edge of the main portion of the saddle member;

wherein the upper surface of the base member has a circular depression therein for receiving a circular bottom wall of the tank adjacent to the bottom of the tank wherein the base member has a pair of anchoring apertures for receiving a portion of the securing band therethrough;

wherein the anchoring apertures are located adjacent to the forward portion of the base member, a pair of wheels being mounted on the rearward portion of the base member;

additionally comprising a handle hole formed in the back member adjacent to the handle end of the back member;

wherein the back member has side edges extending between the handle end and the mounting end, each of the side edges of the back member having a seat belt notch for locating therein a portion of a seat belt passing adjacent to the side edge of the back member, each of the seat belt notches forming a gap in the side edge extending into the side edge such that the seat belt is movable through the gap into the notch without disconnecting opposite portions of the seat belt from each other;

additionally comprising a pair of upper apertures in the back member for receiving the securing band therethrough; and wherein the upper apertures are located toward the handle end of the back member, the upper apertures being laterally spaced from each other.

* * * * *